Sept. 8, 1942.                    G. M. BUNDY                    2,295,156
                     VALVE AND VALVE SEAT FOR ACCORDIONS
                         Filed Jan. 22, 1941          2 Sheets-Sheet 1

Inventor
GEORGE M. BUNDY
By Edwin Leuischer
Attorney

Sept. 8, 1942.  G. M. BUNDY  2,295,156
VALVE AND VALVE SEAT FOR ACCORDIONS
Filed Jan. 22, 1941  2 Sheets-Sheet 2
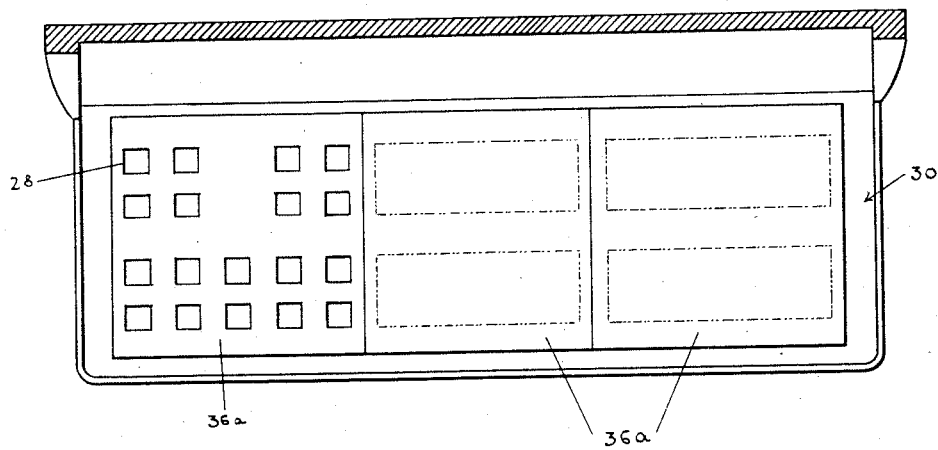
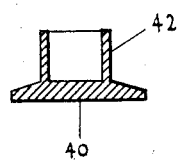
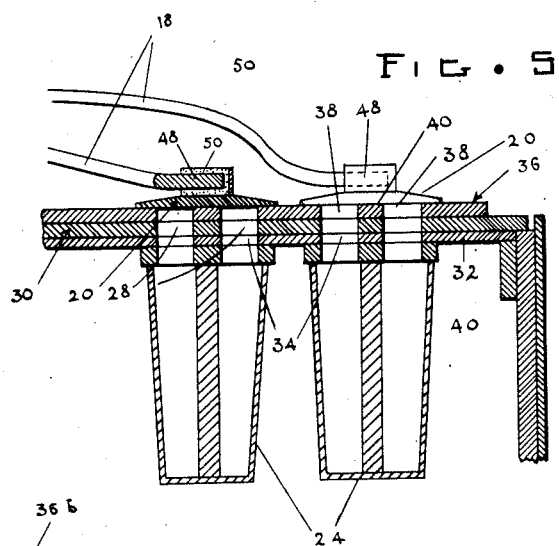
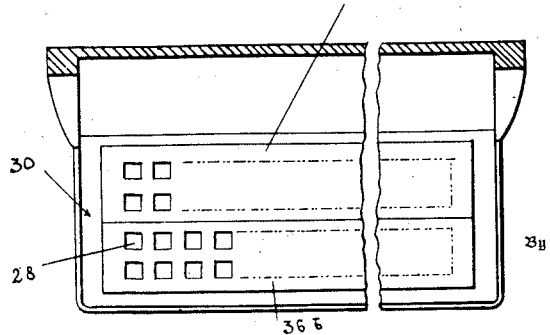
Inventor
GEORGE M. BUNDY
Attorney Patented Sept. 8, 1942

2,295,156

UNITED STATES PATENT OFFICE 2,295,156

VALVE AND VALVE SEAT FOR ACCORDIONS

George M. Bundy, Beechhurst, N. Y., assignor to H. & A. Selmer, Inc., Elkhart, Ind., a corporation of Indiana Application January 22, 1941, Serial No. 375,399

2 Claims. (Cl. 84—376)

This invention relates to accordions and more particularly to improvements in valves and valve seats therefor.

In the usual accordion the valves which are operated by the keys for controlling the passage of air through the reed blocks for vibrating the reeds are each provided with a felt or other pad layer for sealing the openings in the valve plate through which the air passes from the reed blocks. The provision of the individual felt layer for the individual valves is unsatisfactory because, among other things, in the event of the development of a leak in one or more of the valves due to impairment of or some defect in the felt layer it is difficult to ascertain the defective valve and ordinarily many of the felt layers must be replaced individually before the leaky valve is ascertained. Moreover, the felt or other pad layers on the valves tend to deaden or muffle the sound, as said felt layers are positioned over the openings in the valve plate even when the valves are in open position with the result that the vibrating air columns which produce the sound encounter the soft felt pads. These and other disadvantages which result from the use of individual pad layers on the valves are eliminated by and pursuant to the purpose of the present invention.

Another object of the invention is to provide an accordion with valves which have non-muffling faces and which can be readily secured to the key-actuated rods in removable and adjustable relation thereto.

The above objects and other objects which might hereinafter appear will be fully understood from the following description considered with reference to the accompanying illustrative drawings.

In the drawings:

Fig. 4 is a view similar to Fig. 2 showing another form of the invention;

Fig. 5 is a transverse sectional view on the line 5—5 of Fig. 1;

Fig. 6 is a view similar to Fig. 2 showing a further form of the invention;

Fig. 7 is a sectional view of the valve on the line 7—7 of Fig. 3.

Figure 1:
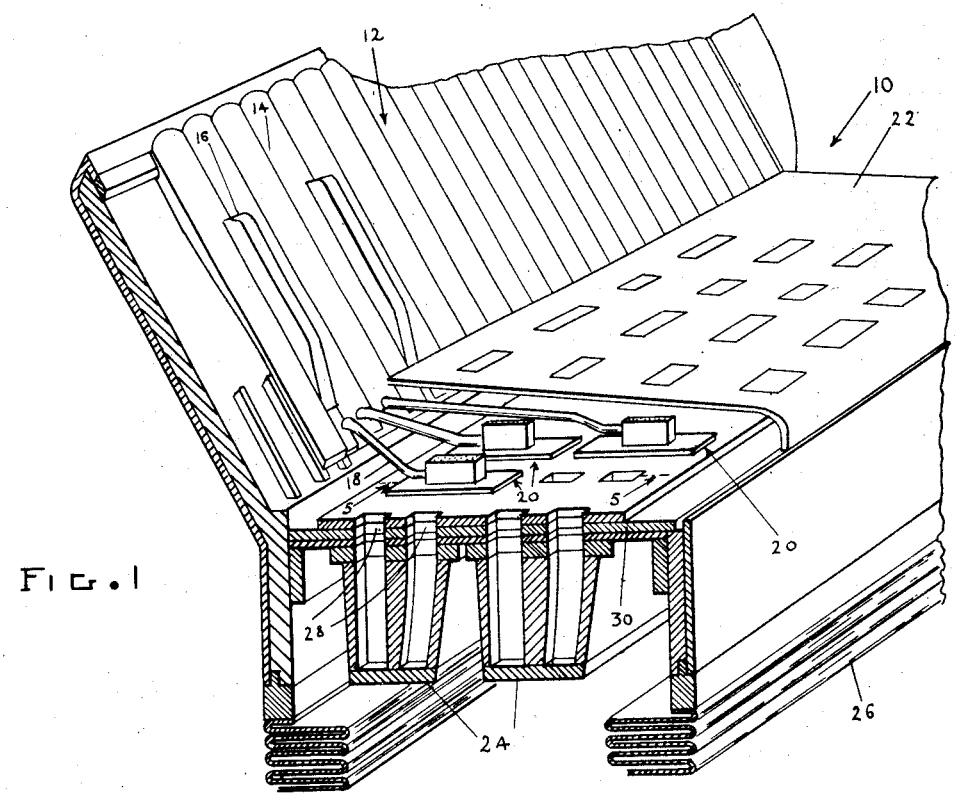
Fig. 1 is a perspective view of part of an accordion, parts being shown in section and parts being cut away for the purposes of illustration.
Figure 2:
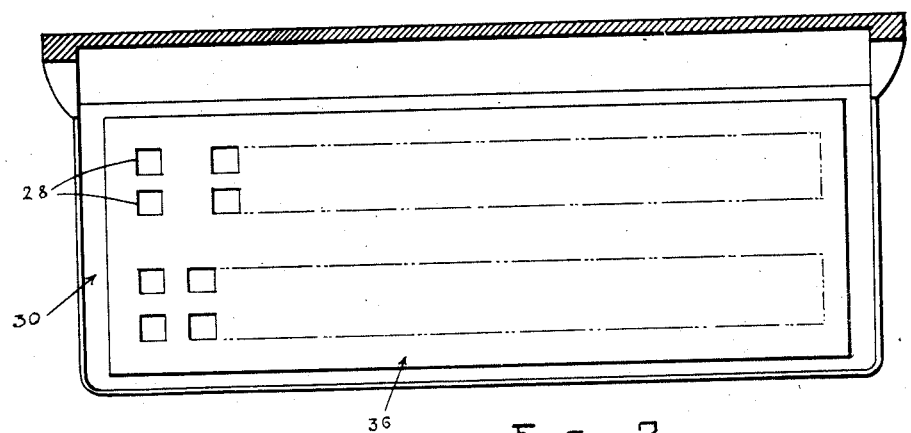
Fig. 2 is a top plan view of the valve chamber, the valves and the grill or cover of the valve chamber being removed.
Figure 3:
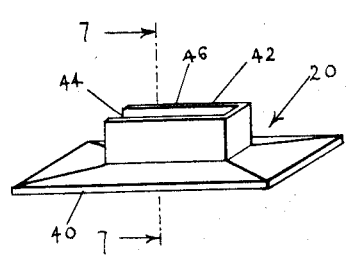
Fig. 3 is a perspective view of a valve embodying the present invention.

Referring now to the drawings in further detail, the accordion 10 embodying the present invention comprises a piano keyboard 12 having the usual white and black keys 14 and 16, respectively, as in the conventional accordion, for operating the valves which control the openings through which passes the sound generated by the reeds. More particularly, said keys are connected by metal rods 18, rigidly fixed to the inner ends of companion keys, to the valves 20, the latter, however, being different from the usual valves as will hereinafter be more particularly described. A grill 22 is disposed over the valves, as in the usual accordion. The reed blocks are indicated at 24 and the accordion bellows is indicated at 26. It will be understood that the accordion is the well known piano keyboard type and comprises all of the elements necessary to an operative instrument, it being unnecessary to illustrate all of said elements.

Each valve 20 controls a pair of companion openings 28 in a metal valve plate 30 which divides the reed and valve chambers. The lower surface of plate 30 has attached thereto a layer 32 of relatively soft sheet material, for example, felt or soft leather such as suede, said layer 32 being provided with openings 34 which register with the openings in plate 30. The outer ends of reed blocks 24 have an air-tight engagement with said layer 32. It will be understood that the reeds in the reed blocks 24 are vibrated when the bellows 26 is actuated and that the sound passes through the companion openings 28.

As hereinbefore indicated an important feature of the present invention resides in eliminating the pads from the valves and in forming air-tight valve seats for the valves on the plate 30 of the valve chamber. For this purpose, a layer 36 of suitable sheet material, preferably thin and soft leather such as suede for example, is secured to the outer surface of plate 30 in any suitable way, preferably by adhesive interposed between the contiguous surfaces of said plate and layer. When, as in the preferred case, layer 36 is formed of suede leather or the like, the napped surface is disposed outermost for engagement by the valves. Layer 36 can be formed of felt or of any other suitable sheet material instead of suede leather. Valve seat layer 36 is provided with openings 38 which register with the openings 28 in plate 30. Layer 36 can be formed in a single piece or in a plurality of sections, each preferably having a plurality of openings therein for a plurality of valves, respectively. In other words, in the preferred embodiment of the invention, a single piece of valve seat material forms a plurality of valve seats. Accordingly, in the event of the development of a leak in one of the valves, it is unnecessary as heretofore to test the valves individually in order to ascertain the valve which is defective, but the defect can be eliminated by removing the layer 36 or one or more sections thereof, when the latter is of sectional construction, and to replace the removed layer or section thereof with a new one. The sectional construction of the valve seat layer is illustrated in Figs. 4 and 6. Thus, as shown by Fig. 4, the valve seat layer is formed in three sections 36a, and as shown by way of example in Fig. 6 the valve seat layer is formed in two longitudinally extending sections 36b. It will be understood that valve seat layer 36 can be formed in more than three sections if desired.

Another important feature of the invention which results from providing the air-sealing layer on the valve plate instead of on the valves resides in the elimination of the sound muffling effect which occurs when, as in the prior practice, the valve faces are covered with felt or other pad layers for sealing the openings in the valve plate. This novel result and advantageous result is accomplished in accordance with the present invention by providing the valves 20 with non-muffling faces. For this purpose, said valves are preferably formed of relatively hard material or have uncovered faces of said material. In the preferred embodiment of the invention valves 20 are formed preferably by molding the same of "Bakelite," Celluloid or any other suitable plastic. Each valve has a flat face 40 which, being uncovered and formed of relatively hard material, eliminates the muffling of the sound which passes through companion openings 28 in the valve plate. Each valve is also provided with a recessed portion 42 molded integrally with the face portion 40. The recessed portion 42 has an end opening 44 and a side opening 46, the inner end portion 48 of a companion rod 18 being disposed within said recessed portion. This construction provides for the adjustment of valves 20 with respect to their companion rods so that said valves can be positioned to lie flat on valve seat layer 36 when the valves are closed. The valves are removably secured to inner ends 48 of rods 18 in adjusted relation by removable means, preferably relatively soft wax 50 which preferably fills recessed portions 42 around the ends 48 of the valve-actuating rods 18. Valves 20 can thus be readily removed and replaced when the occasion arises, and it is a simple matter by reason of the construction and arrangement herein provided to adjust the valve in relation to its companion actuating rod so that the valve face will lie flat on the valve seat layer 36.

While I have shown and described the preferred embodiment of my invention it will be understood that the latter may be embodied otherwise than as herein specifically illustrated or described and it will be also understood that in the illustrated form of the invention certain changes in the details of construction and in the arrangement of parts can be made without departing from the principles of the present invention. Therefore, I do not wish to be limited to the invention as herein illustrated or described except to the extent which may be required by the scope of the appended claims.

Having thus described my invention, what I claim and desire to secure by Letters Patent is:

1. In an accordion having a plurality of vibratory reeds and a plate having a plurality of sound-outlet openings, one for each of said reeds, for the passage of sound generated by said reeds, respectively, in response to the action of the accordion bellows, a plurality of valves for controlling said openings, respectively, each of said valves having a face portion confronting a companion opening in said plate and a recessed portion projecting from said face portion, key-actuated rods having their inner ends seated in said recessed portions, respectively, and plastic material in said recesses for removably and adjustably securing said inner ends of the rods in said recessed portions.

2. In an accordion having a plurality of vibratory reeds and a plate having a plurality of sound-outlet openings, one for each of said reeds, for the passage of sound generated by said reeds, respectively, in response to the action of the accordion bellows, a plurality of valves for controlling said openings, respectively, each of said valves having a face portion confronting a companion opening in said plate and a recessed portion projecting from said face portion, key-actuated rods having their inner ends seated in said recessed portions, respectively, said recessed portion having an end opening and a side opening for adjusting the valve in relation to a companion rod, and removable means comprising plastic material received in said recesses for removably securing the valves to their companion rods in their adjusted relation.

GEORGE M. BUNDY.